J. R. BLAKESLEE.
Improvement in Nut-Machines.
No. 132,047.
Patented Oct. 8, 1872.
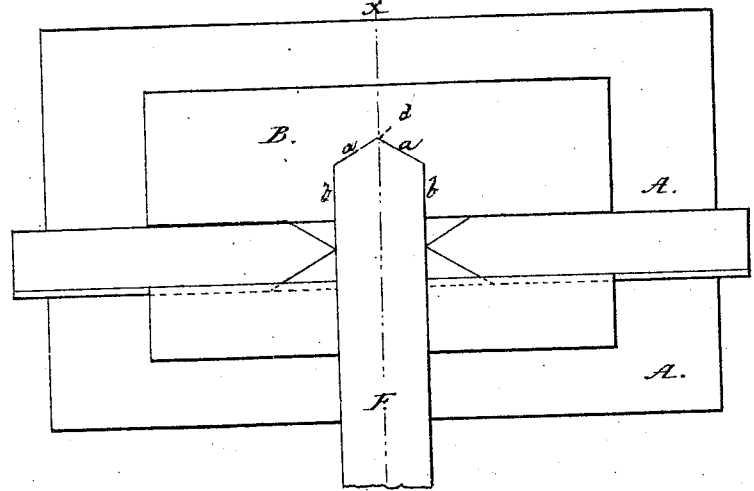
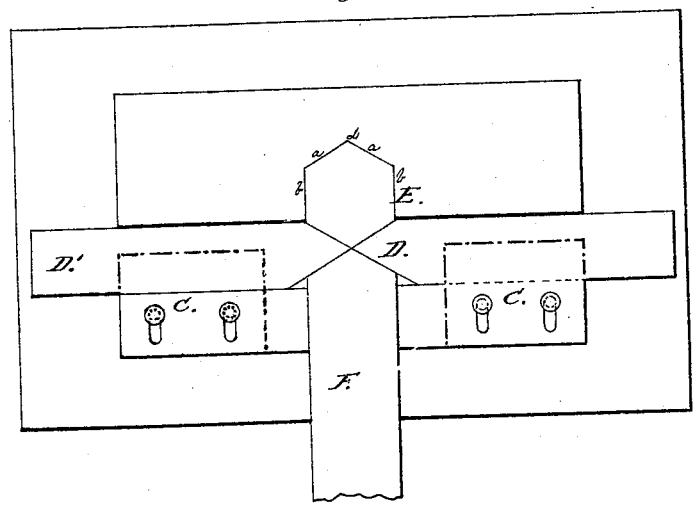
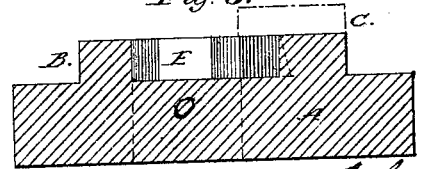
Witnesses:
Inventor:
John R. Blakeslee.
By James L. Norris.
Atty.

UNITED STATES PATENT OFFICE.

JOHN R. BLAKESLEE, OF YOUNGSTOWN, OHIO.

IMPROVEMENT IN NUT-MACHINES.

Specification forming part of Letters Patent No. 132,047, dated October 8, 1872.

*To all whom it may concern:*

Be it known that I, JOHN R. BLAKESLEE, of Youngstown, in the county of Mahoning and State of Ohio, have invented certain new and useful Improvements in Machine for Making Six-Sided Nuts, of which the following is a specification:

My invention has for its object to improve upon the method and the complex mechanism now employed in manufacturing what is known in the trade as "six-sided or hexagonal nuts." The prime features of my invention relate to the arranging of two shears or cutters, each having a V-shaped cutting-edge, operated upon by any suitable driving mechanism, in such a manner as to advance toward each other in a straight line, in such respect to the seat or die as to form two sides of the same, whereby a nut cut or severed from a bar in said seat will be of hexagonal form, said shears or cutters moving in guides arranged upon a bed-plate, all of which will hereinafter be more fully set forth.

In the drawing, Figure 1 is a top view of the bed-plate and its open-sided die, and showing the shears or knives in position to cut the nut from the bar; Fig. 2 is a similar view, showing the nut cut from the bar, and also showing a different bearing for the knives; and Fig. 3 is a central vertical cross-section on line $x\ x$, Fig. 1.

The letter A represents a rectangular or other shaped base, of iron or steel, to which is secured, or with which is made, a steel bed-plate or gage, B. This plate is made with grooves or adjustable bearing-plates C C, in which are fitted to be moved shears or knives D D, the cutting-edges of which are made V-shaped and of steel, and may be made removable for the purpose of sharpening or replacing with new edges. In Fig. 1 the shears are shown in a dovetailed groove. In Fig. 2 adjustable bearing-plates $c$ are used, and in Fig. 3 both forms are shown in dotted lines. Either way the shears are firmly held in the grooves, and have free reciprocating movement toward and from each other, and are prevented from rising or not cutting correctly. E is a seat or die formed in the bed-plate B, which, when the edges of the knives meet, is in outline a hexagon. The seat or die E is constructed of two rear walls, $a\ a$, and two side walls, $b\ b$, the rear walls oblique to the said side walls, so as to form the angle $d$. The remaining front walls are made up by the beveled faces of the shears, so that when the blank is being cut it is swaged from all sides, each blank being of uniform size and finish. Beneath the seat or die thus formed is a discharging-orifice, O, through which the blank is conveyed. F is the bar of metal from which the nut is to be cut.

The knives or shears may be arranged so as to cut in a vertical or horizontal plane; but the latter is in many respects preferable.

Any suitable means and power may be used for giving the proper motion to the shears for cutting. The edges of the shears are in a straight line, and hence always cut true edges on the nut.

The operation is as follows: A bar of the proper size has a triangular piece cut from each corner of one end, so as to fit into the seat or die E with a plunger. It is held tightly therein, and the shears are then brought together and cut through the bar, leaving a hexagonal nut in the die, and of course leaving the end of the bar cut ready to be moved into the die. The nut is then forced through an opening in the bed-plate and base, under the seat or die, into a former, where it is punched, swaged, and then carried through said former in a finished state.

By providing this die the end of the bar being cut off cannot raise or be cocked, and hence the edges of the nut are without fins, smooth, regular, and evenly cut; and I have found by actual experiment that by the use of my machine there is a saving of about eighty per cent. in material; or, in other words, four thousand pounds of metal made up into hexagonal nuts by the old means and in the old way will yield only two thousand pounds of nuts, while by the use of my machine four thousand pounds of metal will yield three thousand four hundred pounds of nuts, and a much better article is produced than heretofore.

Having thus described my invention, what I claim, and desire to secure by Letters Patent, is—

The combination of the reciprocating pointed cutters D D' and the seat or die E, the latter composed of two straight and two oblique sides, with a discharge-orifice beneath, substantially as described, for the purpose specified.

In testimony that I claim the foregoing I have hereunto set my hand.

JOHN R. BLAKESLEE.

Witnesses:
WM. J. PEYTON,
ALBERT H. NORRIS.